Patented Apr. 6, 1937

2,076,036

UNITED STATES PATENT OFFICE 2,076,036

FOOD PRODUCT AND PROCESS OF PREPARATION

Albert S. Leo, Ontario, Calif., assignor to California Fruit Growers Exchange, Los Angeles, Calif., a corporation of California No Drawing. Application October 17, 1932, Serial No. 638,255

9 Claims. (Cl. 99—132)

All of the subject matter of the present application was contained in application Serial No. 403,118, filed October 28, 1929, by Elbert C. Lathrop and Albert S. Leo for Food product and process of preparation, pending before the United States Patent Office at the time of the filing of the present application.

This invention is directed primarily to a mixture composed of sugar and pectin, together with the other necessary ingredients to form a base to be used for making jellies, jams, marmalade, and the like, and in fact, capable of many advantageous uses in cooking, particularly where it is desired that the final product should have a more or less smooth and possibly jell-like texture. Among some of the varied uses which have been noted, the use of the mixture appears to assist in maintaining the freshness of cakes and the like, and assists in the production of cake icings and candy with a soft texture and without tendency to quickly harden or dry out.

In addition to the above, a still further object is to provide a mixture as stated, the use of which is very simple. More particularly, this mixture in many of its uses is merely substituted for the equivalent amount of sugar which would ordinarily be used, and in the making of jellies it is used measure for measure with the fruit juice from which the jellies are made.

Whereas, hereafter reference will ordinarily be made to jellies, their characteristics, and steps of preparation, it is to be understood that such reference is to be taken broadly to include various products to which it is desired to impart a more or less smooth jell-like texture.

Of course, as one of the essential objects of this invention, there is comprised the various uses of products made by the use of the mixture.

It is known that edible jellies used for home consumption are composed of essentially water, sugar, pectin and acid. Pure natural fruit jellies contain in addition to the above ingredients a certain amount of coloring matter, flavoring oils, gums and salts. In the descriptive matter hereafter, reference to the use of water in connection with the use of the mixture is used substantially interchangeably in the sense that fruit juices and the like, which are used for the making of jellies and similar products, are to be considered equivalents thereto.

It has further been well known that the proper amount of sugar, pectin, water, and acid will readily produce a very satisfactory jelly, and in making jellies from natural fruit juices they have been made by selecting various fruits which have the necessary ingredients in substantially the proper proportion to produce gelation. By the addition of sugar to the natural fruit juices and by boiling off the necessary proportion of water from the mixture, jellies have been made.

As distinguished from the making of jellies by the addition of only sugar to the natural fruit juices, jellies have been made by the addition of the necessary sugar, pectin, and acid properly proportioned, whereby on boiling off the necessary amount of water jellies may be formed. In these various prior processes it has been essential that either the pectin be added to the other constituents as a solution, or that the acid not be added to the mixture until it has been concentrated to the proper sugar concentration, at which point the acid can be added.

A still further method which has been employed has been to add to fruit juices a portion of the necessary sugar, together with the necessary pectin and acid whereby the initial sugar, pectin and acid have been dissolved and thereafter the remainder of the necessary sugar is added. To state the above in a different way, it has not in the past been possible to provide a dry mixture to be used in making jellies and the like in which mixture there is provided initially all of the sugar, pectin, and acid necessary to produce a satisfactory jelly.

As distinguished from the above, the primary purpose of this invention is to provide a dry mixture of jelly base ingredients, which mixture contains all of the necessary sugar, pectin, and acid in the proper proportions and modified whereby such mixture may be added to the proper amount of water or fruit juices to form a very satisfactory jelly.

The reason that it has not in the past been possible to provide a dry base mixture containing all the necessary ingredients is that in sugar solutions of relatively high sugar content, about 65% concentration of sugar comprising that usual in making jelly, and in the presence of acid, dry powdered pectin does not go into solution, or at best it goes into solution only very slowly. In the presence of the acid and sugar, the pectin is inhibited from going into solution, the acid apparently causing local jelling on the surface of the pectin particles, which coating prevents further solution of the pectin by preventing ready access of water thereto.

It has been discovered that with distilled water, and by very carefully regulating the quantities of each, the water, the jell base mixture, and the proportion of the constituents of mixture, a jelly can be made by a combination of the water and the base mixture containing all of its necessary ingredients in dry form.

The making of jelly using distilled water and using ordinary tap water or fruit or berry extracts are quite different matters in that chlorinated water, hard water, iron water, and the like will affect the results obtained, as will the natural sugar, pectin, acid, salts and gums of the fruits and berries.

The essential feature of this invention is that it has been discovered that if, instead of using acid only, there is employed instead a buffer mixture comprising acid and a buffer salt combined in the proper proportions, it is possible through the use of such a buffer mixture to prepare a jelly base mixture containing all of the necessary sugar, pectin, and acid in dry form as a mixture from which jellies can always be made readily and easily. The buffer mixture properly proportioned acts as what might be termed a reservoir to absorb the effects of chlorine, etc., and of the fruit acid and salts.

Of various buffer mixtures which are available and might be used, there has been selected as particularly suitable, and has been investigated in considerable detail, the buffer mixture containing tartaric acid and sodium acetate and mixtures of acid with similar buffer salts, such as sodium tartrate.

The base mixture which has been determined as that most satisfactory for general use contains one pound of sugar, 3 grams of pectin (160 strength), 3 grams tartaric acid, and 1½ grams sodium acetate. Whereas the amounts of the ingredients of this mixture have been definitely given, it is, of course, to be understood that a certain amount of variation is allowed, that is, the mixture as stated will produce a satisfactory jell of approximately 65% sugar concentration. Somewhat less pectin might be used to produce a jelly of higher sugar concentration, or somewhat more pectin might be used to produce a jelly of a lower sugar concentration. The total amount of the buffer mixture can be slightly varied, or the ratio of its ingredients can be slightly varied without necessarily making the base mixture unsuitable for its purpose. The mixture which was given has under the majority of conditions produced a most satisfactory jelly in the majority of cases in which it has been specifically tried. This does not necessarily mean that under each individual condition the most satisfactory jelly which could have been produced was actually produced, that is, the mixture is to take care of the variable conditions met in use whereby there may be prepared the best average jelly. The limitations of variation of the mixture, particularly variation of the buffer mixture, appears to be such variations and its quantities or proportions as will maintain acidity within the range of pH 2.7 and pH 3.0 approximately. Outside of the pH limits given, the jellies are seldom, if ever, satisfactory, and even toward the limits of the range give satisfactory jelly as rather the exception than the rule.

Whereas, tartaric acid has been specifically mentioned, and whereas sodium acetate has also been specifically mentioned, it is to be definitely understood that other acids may be substituted for the tartaric acid, for instance, citric or other acid available in crystal or granular form, and that for the sodium acetate there may be substituted other buffer salts comprising strong bases and weak acids. In using substitute acids and buffer salts, they are to be used in amounts proportionately to the relation of their hydrogen ion dissociation relative to that of the acid and buffer specifically mentioned.

In the use of the base mixture equal measures of the mixture and of water or fruit juices and the like are heated and boiled until the usual jelly sheeting test is observed, and this product on cooling will produce a satisfactory jelly which should be of sufficient strength and yet not gummy. To produce jellies it is possible to use either fruit juices to provide flavoring and color, or to produce cheaper jellies, coloring matter, and artificial flavoring can be added to a water jelly and the results obtained in using the described jelly base will be found equally satisfactory in either case.

In the course of the experiments relative to the use and practicability of the dry base jelly mixture herein set forth, measurements were made on jellies prepared with distilled water to determine the active acidity or the hydrogen ion concentration. The hydrogen ion dissociation was measured colorimetrically, and the figures given herein can not be more accurate than is characteristic of such determinations, and, in fact, are probably somewhat less accurate than is usual, since the initial readings were taken on a sugar solution on initiation of boiling and the final readings were taken on cool jelly to which the indicator had been added prior to its set and while the syrup was quite hot.

While, as above stated, the readings may be somewhat in error, it appears that the pH determinations are at least comparative for the experiments made, and such readings indicate that the hydrogen ion concentration falls within a relatively narrow range, that is, between approximately the values expressed by pH 2.7 and pH 3.0 as the extreme limits. The figures just given are of course those taken on jellies made with distilled water, since due to the natural coloration of jellies made with fruit juices, it is difficult or impossible to colorimetrically determine the pH thereof.

It is to be noted that there is given in connection with any specifically recited amount of pectin an indication of the pectin strength. Commercial pectin varies considerably in strength and is bought according to jelly units, that is, 100 strength pectin will jell 100 pounds of sugar to a 65% sugar jelly, whereas 160 strength pectin will jell 160 pounds of sugar to a 65% jell. The pectin, of course, is to be used in amounts inversely proportionate to its jelly strength.

In making experiments in connection with the development of this invention, it was noted that with some sugars apparently not fully refined sugars, a slight variation of the buffer mixture was necessary, apparently to compensate for the impurities of the sugar. It can be readily determined whether the quantity of the buffer mixture should be varied, since should the sample made up with distilled water and cooked to conditions which should produce a jelly fail to jell, it is an indication that the amount of buffer mixture should be slightly increased, or should a jell be formed with a broken set, it is an indication that the buffer mixture should be slightly decreased, and such variations can be employed to compensate for variations in the sugar used.

To make a jelly with the dry base mixture described, 17 ounces of water or fruit juices has added to it an equal volume of the dry base mixture, which volume will be made of one pound of sugar, 3 grams of pectin (160 strength), 3 grams tartaric acid, and 1½ grams sodium acetate. This should be placed in a relatively large pan whereby it can be rapidly heated and quickly boiled, and when boiled down to approximately 25 ounces, the mixture will show the jelly sheeting test and is then ready to be poured and cooled. If the boiling is at all rapid, it is ordinarily possible to in this manner prepare a jelly within five minutes, which jelly, when cooled, is ready for use.

On consideration of the above, it will be seen that there has been clearly described a dry base mixture from which, by following the simple directions given, that is, to combine equal amounts of the liquid constituents and the dry base mixture and to boil to the sheeting test, a good jelly may be assured and that there is provided a base mixture which can be incorporated in place of ordinary sugar in a great many cooking recipes to impart to the product in particular a smooth texture and which, incidentally, in products such as cake, candy, and the like, tends not only to produce a smooth texture, but in addition considerably enhances the keeping qualities, that is, tends to prevent such products from rapidly drying out.

I claim:

1. A dry jelly base mixture comprising primarily sugar, pectin, acid, all in the proportions necessary to make jelly, and sodium acetate, the acid and sodium acetate constituting a buffer mixture and being present in proportion one to another and to the entire constituents of the mixture adapted to maintain a pH of between about 2.7 and 3.0, when said base mixture is mixed with an approximately equal amount of water and heated to boiling, said boiled mixture being capable of setting to a jelly.

2. A dry jelly base mixture comprising the following in substantially the proportions given one pound of sugar, 3 grams of pectin (160 strength), 3 grams of tartaric acid, and 1¼ grams of sodium acetate, the amount of sodium acetate being such that upon the addition of said base mixture to an approximately equal volume of water or fruit juice, heating to boiling and allowing to set, a jelly will be formed.

3. A composition of matter for jelly making including a dry mixture of pectin, sugar, acid, and a non-effervescent buffer salt comprising a salt of a strong base and a weak acid, the amount of said buffer salt being so proportioned that a given volume of the mixture is capable of dissolving in a substantially equal volume of water or fruit juice, and all of said ingredients being present in proportion such that upon addition of said base mixture to a substantially equal volume of water or fruit juice, heating to boiling and allowing to set, a jelly will be formed.

4. A composition of matter for jelly making including a dry mixture of pectin, sugar, acid, and sodium acetate, the amount of said sodium acetate being so proportioned that a given volume of the mixture is capable of dissolving in a substantially equal volume of water or fruit juice, and all of said ingredients being present in proportion such that upon addition of said base mixture to a substantially equal volume of water or fruit juice, heating to boiling and allowing to set, a jelly will be formed.

5. A composition of matter for jelly making including a dry mixture of pectin, sugar, acid, and sodium tartrate, the amount of said sodium tartrate being so proportioned that a given volume of the mixture is capable of dissolving in a substantially equal volume of water or fruit juice, and all of said ingredients being present in proportion such that upon addition of said base mixture to a substantially equal volume of water or fruit juice, heating to boiling and allowing to set, a jelly will be formed.

6. A dry jelly base mixture comprising pectin, sugar, acid, and a buffer salt comprising a salt of a strong base and acetic acid, the amount of said buffer salt being so proportioned that a given volume of the mixture is capable of dissolving in a substantially equal volume of water or fruit juice, and all of said ingredients being present in proportion such that upon addition of said base mixture to a substantially equal volume of water or fruit juice, heating to boiling and allowing to set, a jelly will be formed.

7. A dry jelly base mixture comprising pectin, sugar, acid, and a buffer salt comprising a salt of a strong base and tartaric acid, the amount of said buffer salt being so proportioned that a given volume of the mixture is capable of dissolving in a substantially equal volume of water or fruit juice, and all of said ingredients being present in proportion such that upon addition of said base mixture to a substantially equal volume of water or fruit juice, heating to boiling and allowing to set, a jelly will be formed.

8. In that method of preparing jellies wherein pectin, acid, and sugar are added to water or fruit juice, boiled, and permitted to set, that step which consists in adding to a substantially equal volume of water or fruit juice a dry mixture containing pectin, acid, and sugar, all in dry form and in the proportions requisite for jelly formation, and concomitantly therewith adding a non-effervescent buffer salt comprising a salt of a strong base and weak acid in amount sufficient to suitably buffer the mixture to permit a given volume of the mixture to dissolve in a substantially equal volume of water or fruit juice.

9. In that method of preparing jellies wherein pectin, acid, and sugar are added to water or fruit juice, boiled, and permitted to set, that step which consists in adding to a substantially equal volume of water or fruit juice a mixture containing pectin, acid, and sugar all in dry form and in the proportions requisite for jelly formation, and heating to boiling and cooling in the presence of an added buffer salt comprising a non-effervescent salt of a strong base and weak acid in amount sufficient to suitably buffer the mixture to permit a given volume of the mixture to dissolve in a substantially equal volume of water or fruit juice, whereby upon allowing to set a jelly will be formed.

ALBERT S. LEO.